(12) United States Patent
Ha et al.

(10) Patent No.: US 7,646,811 B2
(45) Date of Patent: Jan. 12, 2010

(54) METHOD OF DETERMINING REFERENCE PICTURE, METHOD OF COMPENSATING FOR MOTION AND APPARATUS THEREFOR

(75) Inventors: Hyeong-seok Ha, Suwon-si (KR); Nam-suk Lee, Seoul (KR); So-young Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 915 days.

(21) Appl. No.: 10/828,417

(22) Filed: Apr. 21, 2004

(65) Prior Publication Data

US 2004/0218676 A1 Nov. 4, 2004

(30) Foreign Application Priority Data

May 1, 2003 (KR) .............. 10-2003-0028038

(51) Int. Cl.
*H04N 7/12* (2006.01)

(52) U.S. Cl. .................... 375/240.16

(58) Field of Classification Search ........... 375/240.16, 375/240.27, 240.01; 725/47; 386/96, 224
See application file for complete search history.

(56) References Cited

U.S. PATENT DOCUMENTS

| | | | | |
|---|---|---|---|---|
| 5,835,667 A | * | 11/1998 | Wactlar et al. | 386/96 |
| 5,963,670 A | * | 10/1999 | Lipson et al. | 382/224 |
| 6,414,665 B2 | | 7/2002 | Libsch et al. | |
| 6,549,660 B1 | * | 4/2003 | Lipson et al. | 382/224 |
| 2005/0114887 A1 | * | 5/2005 | Gelissen | 725/47 |
| 2006/0193387 A1 | * | 8/2006 | Wu et al. | 375/240.16 |

FOREIGN PATENT DOCUMENTS

| | | |
|---|---|---|
| EP | 1 104 197 A2 | 5/2001 |
| JP | 11-75187 A | 3/1999 |
| JP | 1999-317961 A | 11/1999 |
| JP | 2002-330443 A | 11/2002 |

* cited by examiner

*Primary Examiner*—Gims S Philippe
(74) *Attorney, Agent, or Firm*—Sughrue Mion, PLLC (57) ABSTRACT

A method of determining a reference picture, a method of compensating for a motion, and an apparatus therefore are provided. The method of determining a reference picture blocks constituting a current picture includes: (a) preparing tag information describing a plurality of pictures; and (b) determining one of the plurality of pictures to be a reference picture by referring to the tag information.

28 Claims, 7 Drawing Sheets

METHOD OF DETERMINING REFERENCE PICTURE, METHOD OF COMPENSATING FOR MOTION AND APPARATUS THEREFOR

BACKGROUND OF THE INVENTION

This application claims the priority of Korean Patent Application No. 2003-28038, filed on May 1, 2003, in the Korean Intellectual Property Office, the disclosure of which is incorporated herein in its entirety by reference.

1. Field of the Invention

The present invention relates to a reference picture used to encode or decode moving picture data, and more particularly, a method of determining a reference picture for blocks constituting a current picture, a method of compensating for a motion, and apparatus therefore.

2. Description of the Related Art

According to Standard H.264 specifying encoding and decoding processes on a moving picture, the encoding and decoding processes are performed in units of multiple macro-blocks in the moving picture or in units of sub-blocks which are obtained by partitioning a macro-block into two or four parts. The encoding and decoding processes are performed based on a motion estimation process. The motion estimation process is performed by referring to a past picture or both past and future pictures. A picture referred to for encoding or decoding a current picture is referred to as a "reference picture."

According to Standard H.264, there is provided a multiple-reference scheme where the macro-blocks and/or the sub-blocks refer to different reference pictures. The reference pictures in the multiple-reference scheme are determined as follows. Firstly, reference pictures recently encoded are stored. The number of the reference pictures is in a range between 1 and 16. Next, a motion estimation process is performed based on all the stored reference pictures. Next, a reference picture giving the best result of the motion estimation process is determined to be a reference picture for a current picture. The multiple-reference scheme shows a higher compression rate and a better image quality than a conventional reference scheme using only one reference picture.

However, the multiple-reference scheme has some problems. Since multiple reference pictures are stored prior to encoding a current picture, a large capacity of a memory is required. In addition, since a reference picture for a current picture is determined by performing a motion estimation process on multiple reference pictures, calculation amount greatly increases. Moreover, it is difficult to encode and decode moving picture data in real time.

SUMMARY OF THE INVENTION

The present invention provides a method of determining a reference picture and an apparatus therefor capable of improving compression rate and image quality and reducing calculation amount.

The present invention also provides a method of compensating for a motion and an apparatus therefor capable of improving compression rate and image quality and reducing calculation amount.

According to an aspect of the present invention, there is provided a method of determining a reference picture for blocks constituting a current picture, the method comprising the steps of: (a) preparing tag information describing a plurality of pictures; and (b) determining one of the plurality of pictures to be a reference picture by referring to the tag information.

In an exemplary embodiment, step (b) comprises the steps of: (b1) assigning priority to at least one picture based on the tag information; (b2) performing a motion estimation process on the blocks by using the priority-assigned picture ahead of other pictures; and (b) if a picture satisfying a predetermined criterion is detected in the motion estimation process of the step (b2), determining the picture to be a reference picture.

According to another aspect of the present invention, there is provided a method of determining a reference picture, the method comprising the steps of: (a) performing a motion estimation process on blocks constituting a portion of a current picture by using pictures indicated by a reference index list, and determining a reference picture based on a result of the motion estimation process; and (b) monitoring the determined reference picture, and determining a reference picture for blocks constituting another portion of the current picture based on a result of the monitoring process.

According to still another aspect of the present invention, there is provided a method of determining a reference picture for blocks constituting a current picture by using a multiple-reference scheme, the method comprising the steps of: (a) performing a motion estimation process by using a recent picture; (b) if a resulting value of the motion estimation process is not more than a predetermined threshold value, determining the recent picture as a reference picture; and (c) if a resulting value of the motion estimation process is not more than a predetermined threshold value, determining the reference picture by using pictures indicated by the reference index list.

In an exemplary embodiment, step (c) comprises the steps of: (c11) performing the motion estimation process on pictures indicated by the reference index list; and (c12) determining the reference picture based on a result of the motion estimation process of the step (c11). In addition, step (c12) may also comprise the step of, if a picture having a residual error not more than a predetermined threshold value is detected, determining the picture to be a reference picture. Also, step (c) may comprise the steps of: (c21) assigning priority to at least one of pictures indicated by the reference index list based on tag information; (c22) performing a motion estimation process on the blocks by using the priority-assigned picture ahead of other pictures; and (c23) determining the reference picture based on a result of the motion estimation process. Step (c21) may comprise the step of performing a monitoring process on tag information corresponding to the determined reference pictures for a predetermined number of blocks constituting the current picture, and assigning priority to a picture having tag information equal to the tag information corresponding to multiple reference pictures.

In an exemplary embodiment, step (c) comprises the step (c3) of preparing the reference index list. In addition, step (c3) may comprise the steps of: loading the recent picture on the reference index list when the recent picture is used as a reference picture for blocks constituting the current picture; loading the recent picture on the reference index list when the recent picture is not used as a reference picture for blocks constituting the current picture and tag information is assigned to the recent picture; and removing the recent picture when the recent picture is not used as a reference picture for blocks constituting the current picture and tag information is not assigned to the recent picture. In addition, step (c3) may comprise the steps of: loading a picture having tag information indicating a big motion of the current picture on the reference index list; and loading a picture having tag information indicating a global change of the current picture on the reference index list.

According to another exemplary embodiment of the present invention, there is provided a method of compensating for a motion, the method comprising the steps of: (a) reading a reference picture, wherein the reference picture is obtained by performing a motion estimation process on blocks constituting a portion of a current picture by using pictures indicated by a reference index list, determining a reference picture based on a result of the motion estimation process, performing a monitoring process on tag information attached to the determined reference picture, and determining a reference picture for blocks constituting another portion of the current picture based on a result of the monitoring process; and (b) performing a motion compensation process by using a motion vector corresponding to the read reference picture.

According to another exemplary embodiment of the present invention, there is provided an apparatus for encoding moving picture data, the apparatus comprising: a memory unit which stores a reference index list and pictures, wherein tag information is attached to a portion of the pictures indicated by the reference index list; a motion estimation unit which performs a motion estimation process on blocks constituting a portion of a current picture by using pictures indicated by a reference index list, determines a reference picture based on a result of the motion estimation process, monitors the determined reference picture, determines a reference picture for blocks constituting another portion of the current picture based on a result of the monitoring process, and calculates a motion vector for the blocks based on the determined reference picture; and a motion compensation unit which performs a motion compensation process by using the reference picture corresponding to the motion vector calculated by the motion estimation unit.

In an exemplary embodiment of the present invention, the motion estimation unit assigns priority to a picture having tag information equal to or associated with tag information corresponding to multiple reference pictures out of pictures indicated by the reference index list, perform a motion estimation process by using the priority-assigned picture ahead of other pictures, and determine a reference picture based on a result of the motion estimation process.

According to another exemplary embodiment of the present invention, there is provided an apparatus for decoding a bitstream having encoded moving picture data, the apparatus comprising: a memory unit which stores a reference picture, wherein the reference picture is obtained by performing a motion estimation process on blocks constituting a portion of a current picture by using pictures indicated by a reference index list, determining a reference picture based on a result of the motion estimation process, performing a monitoring process on tag information attached to the determined reference picture, and determining a reference picture for blocks constituting another portion of the current picture based on a result of the monitoring process, wherein the current picture constitutes the encoded moving picture data; a motion vector decoding unit which decodes the motion vector extracted from the bitstream; and a motion compensation unit which performs a motion compensation process by using a reference picture read from the memory and a motion vector provided by the motion vector decoding unit.

In an exemplary embodiment of the present invention, the memory unit stores the reference picture, wherein the reference picture is obtained by assigning priority to a picture having tag information equal to or associated with tag information corresponding to multiple reference pictures out of pictures indicated by the reference index list, performing a motion estimation process by using the priority-assigned picture ahead of other pictures; and determining a reference picture based on a result of the motion estimation process.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF ILLUSTRATIVE, NON-LIMITING EMBODIMENTS OF THE INVENTION

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining exemplary embodiments of the invention with reference to the attached drawings. Like reference numerals in the drawings denote like elements.

An encoder according to the present invention encodes moving picture data. A moving picture is constructed with pictures, represented in a time axis, each of which has a frame or fields. Each picture is constructed with a plurality of blocks. The frame includes a progressive scan frame and an interlaced scan frame. The field includes top and bottom fields which constitute the interlaced scan frame. The block includes a macro-block and a sub-block obtained by vertically or horizontally partitioning the macro-block into two or four parts.

Figure 1:
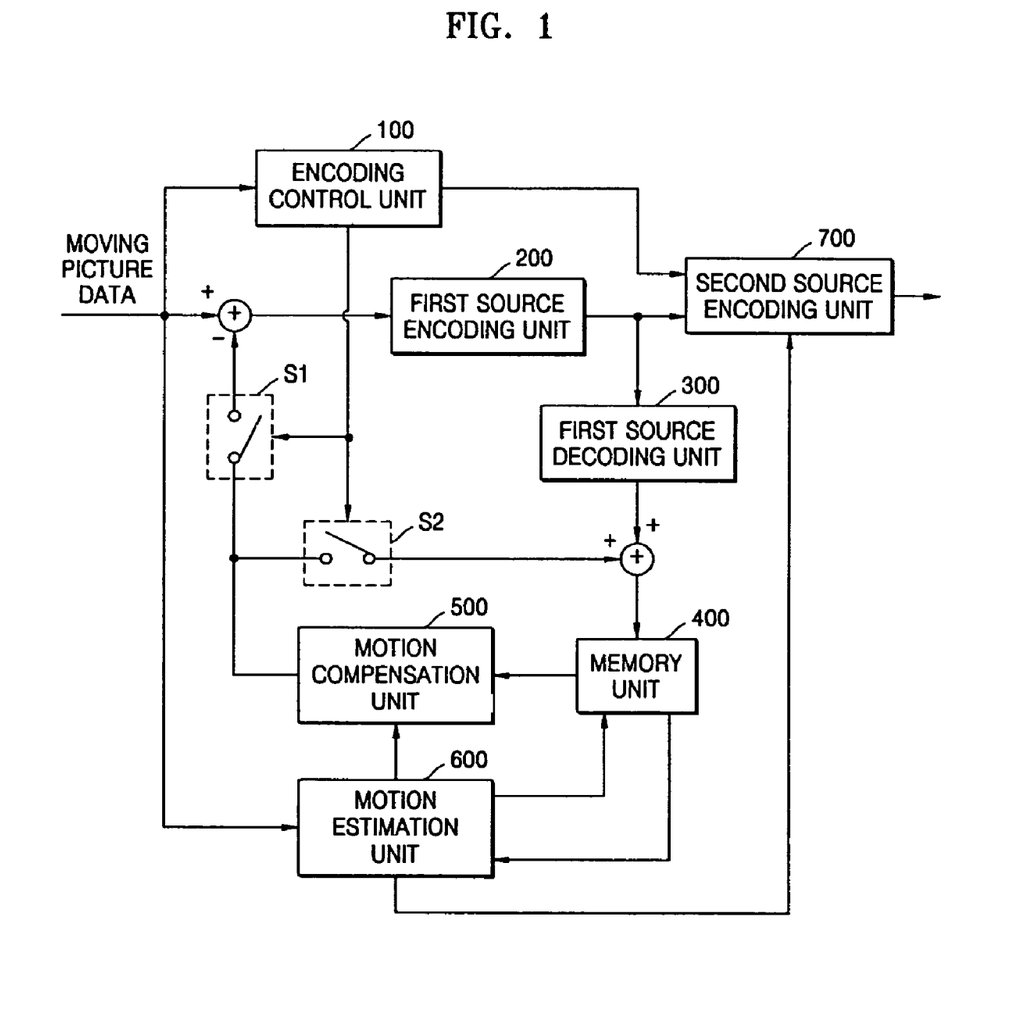
FIG. 1 is a block diagram illustrating an encoder according to an exemplary embodiment of the present invention.

FIG. 1 is a block diagram illustrating an encoder according to an embodiment of the present invention.

The encoder encodes a current picture by using a multiple-reference scheme referring to multiple past and/or future pictures. The encoder comprises an encoding control unit 100, a first source encoding unit 200, a second source encoding unit 700. In addition, the encoder further comprises a first source decoding unit 300, a memory unit 400, a motion compensation unit 500, and a motion estimation unit 600. In the memory unit 400 is stored a reference index list and pictures indicated by the reference index list. The motion compensation unit 500 performs a motion compensation process, and the motion estimation unit 600 determines a reference picture and performs a motion estimation process by using the determined reference picture.

When the moving picture data is input, the encoding control unit 100 determines a coding type out of inter-coding and intra-coding types in accordance with whether or not the motion compensation is to be performed on the input moving picture data, and output a control signal corresponding to the coding type to a first switch S1. Hereinafter, moving picture data currently input is referred to as "current moving picture data." In a case where the motion compensation process is performed, that is, in case of inter-coding, since moving picture data input prior to the current moving picture data (hereinafter referred to as "past moving picture data") and/or moving picture data input after the currently input moving picture data (hereinafter referred to as "future moving picture data") is needed, the first switch S1 is closed. In a case where the motion compensation is not performed, that is, in case of intra coding, since past and/or future moving picture data is not needed, the first switch S1 is opened. When the first switch S1 is closed, difference moving picture data obtained from the current moving picture data and the past and/or future moving picture data is input to the first source encoding unit 200. When the first switch S1 is opened, only the current moving picture is input to the first source encoding unit 200.

In the embodiment, the moving picture data input to the first source encoding unit 200 corresponds to an I picture when the first switch S1 is opened. The moving picture data input to the first source encoding unit 200 corresponds to a P or B picture when the first switch S1 is opened. The to-be-encoded moving picture data comprises data for a plurality of pictures. The I picture is an intra picture obtained without reference to other pictures. The B picture is a bi-predictive picture obtained with reference to two different pictures. The P picture is a predictive picture obtained with reference to only the I picture. In the embodiment, the encoding process is performed on blocks. As described above, the block includes a macro-block constituting a picture, and a sub-block obtained by vertically or horizontally partitioning the macro-block into two or four parts.

The first source encoding unit 200 obtains transform coefficients by performing a transform process on the picture, quantizes the transform coefficients, and outputs quantized transform coefficients. The transform process includes, for example, a discrete cosine transform (DCT) process and a wavelet transform process. The quantization process is performed in accordance with predetermined quantization steps.

On the other hand, the encoded picture output from the first source encoding unit 200 is subjected to inverse-quantization and inverse-transform processes in the first source decoding unit 300, and the resulting picture is stored in the memory unit 400 as a reference picture used for the moving picture compensation process on past or future blocks. In the memory unit 400 is stored the pictures indicated by the reference index list. In the embodiment, tag information is attached to some portion of the pictures excluding a recent picture. Alternatively, the tag information may be attached to the pictures indicated by the reference index list. The motion estimation unit 600 determines the reference picture based on the reference index list and the picture stored in the memory unit 400. The reference picture determination process will be described in detail later. In addition, motion estimation unit 600 calculates a motion vector based on the determined reference picture. Herein, the motion vector is calculated with reference to a plurality of past and/or future pictures.

The motion compensation unit 500 reads from the memory 400 a reference picture indicated by the motion vector, performs the motion compensation process based on the reference picture and motion vector, and outputs a motion compensation value. The motion compensation value is added to data output from the first source encoding unit 300 to reproduce a picture constituting the current moving picture data, and the reproduced picture is stored in the memory unit 400 in order to be used for motion estimation and compensation processes.

The second source encoding unit 700 generates a bitstream by encoding and multiplexing the quantized transform coefficients output from the first source encoding unit 200, the motion vector output from the motion estimation unit 600, and coding information, quantization information, etc., output from the encoding control unit 100. In the embodiment, the second source encoding unit 700 also performs an entropy encoding process.

Figure 2:
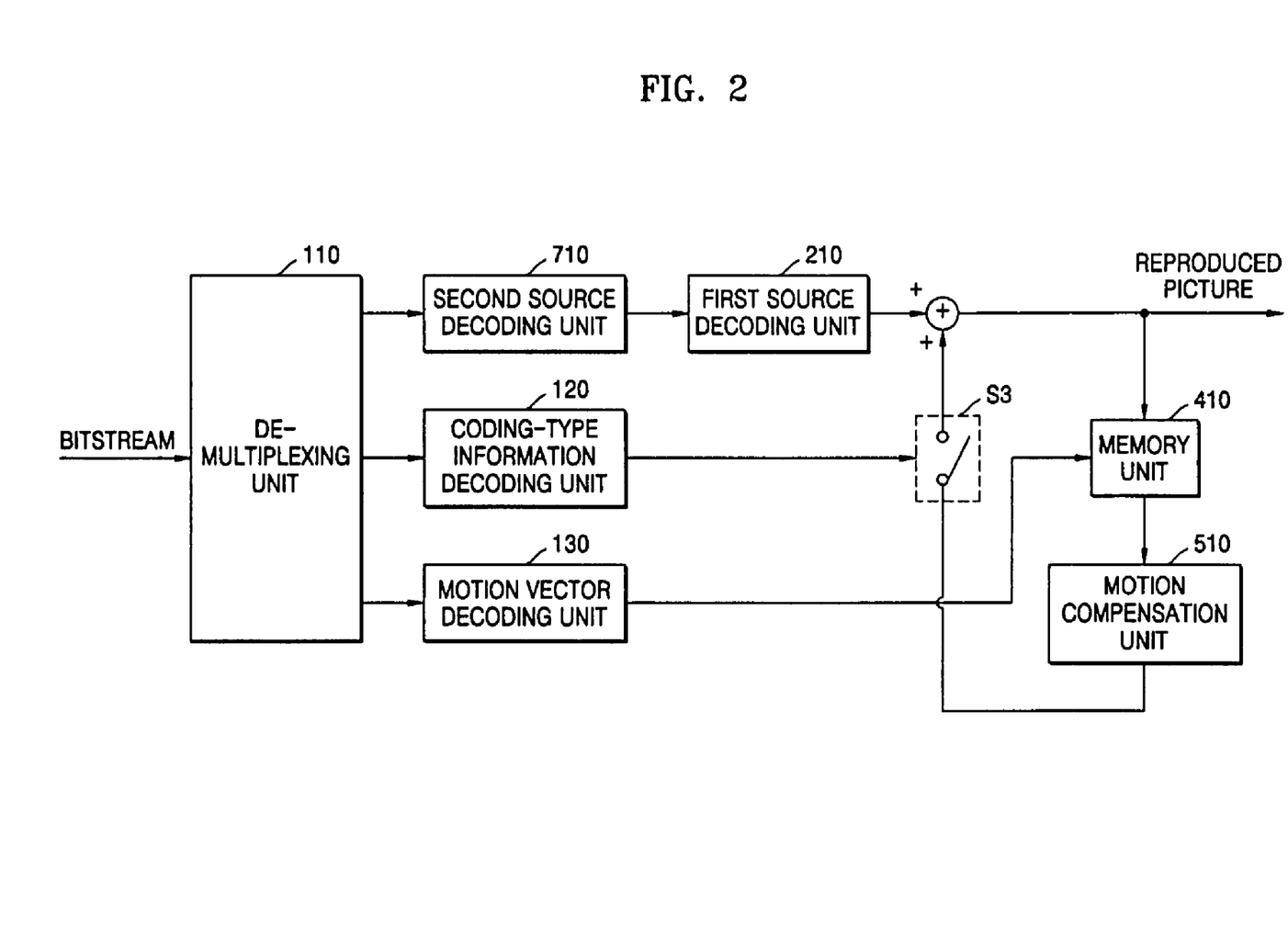
FIG. 2 is a block diagram illustrating a decoder according to an exemplary embodiment of the present invention.

FIG. 2 is a block diagram illustrating a decoder according to an embodiment of the present invention.

The decoder decodes the bitstream containing the encoded moving picture data from the encoder of FIG. 1. The decoder comprises a de-multiplexing unit 110 for de-multiplexing the bitstream, a second source decoding unit 710, and a first source decoding unit 210. In addition, the decoder further comprises a coding-type information decoding unit 120 for decoding coding-type information and a motion vector decoding unit 130 for decoding a motion vector. The decoder further comprises a memory unit 410 and a motion compensation unit 510.

The de-multiplexing unit 110 de-multiplexes the bitstream to output encoded, quantized transform coefficients, motion vector information, and coding-type information. The second source decoding unit 710 performs an entropy decoding process on encoded transform coefficients to output quantized transform coefficients. The first source decoding unit 210 performs a first source decoding process on the quantized transform coefficients. The first source decoding process is an inverse process of the first encoding unit 200 of FIG. 1. For example, if a DCT process is performed in the first encoding unit 200, an inverse DCT (IDCT) process is performed in the first source decoding unit 210. Similarly, if a wavelet transform process is performed in the first encoding unit 200, an inverse wavelet transform process is performed in the first source decoding unit 210. As a result, pictures constituting the moving picture data are reproduced. The reproduced pictures are stored in the memory unit 410.

The coding-type information decoding unit 120 decodes the coding-type information to detect the coding type. As a result, in case of inter-coding requiring motion compensation, the third switch S3 is closed. A motion compensation value from the motion compensation unit 510 is added to data output from the first source decoding unit 210 to obtain a reproduced picture. The motion vector decoding unit 130 decodes the motion vector. The motion compensation unit 510 performs a motion compensation process by using a reference picture indicated by a decoded motion vector and outputs a motion compensation value.

In particular, the motion compensation unit 510 performs a motion compensation process by using a reference picture determined according to the present invention. The reference picture is stored in the memory unit 410. In other words, the memory unit 410 stores a reference picture obtained by performing a motion estimation process on blocks constituting a portion of a current picture by using pictures indicated by a reference index list, determining a reference picture based on a result of the motion estimation process, performing a monitoring process on tag information attached to the determined reference picture, and determining a reference picture for blocks constituting another portion of the current picture based on a result of the monitoring process. Details of the determination of the reference picture will be described later.

Figure 3:
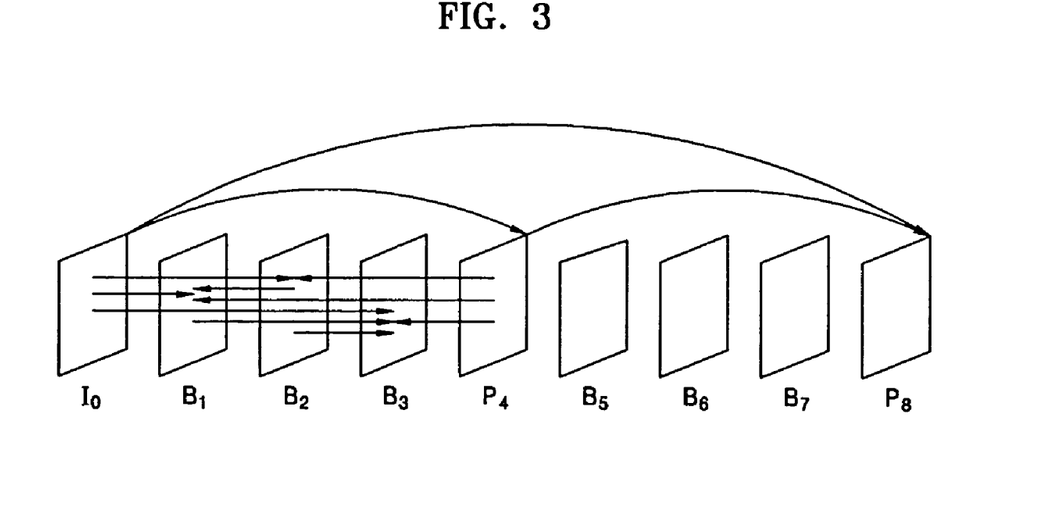
FIG. 3 is a view for explaining a multiple-reference scheme according to an exemplary embodiment of the present invention.

FIG. 3 is a view for explaining a multiple-reference scheme according to an exemplary embodiment of the present invention.

As described above, the moving picture data comprises data for I, B, and P pictures. The multiple-reference scheme is a scheme for encoding or decoding the B and P pictures with reference to past and/or future pictures. In FIG. 3, arrows indicate dependencies between pictures, which are used as reference pictures in an encoding or decoding process. For example, a $B_2$ picture is dependent on $I_0$ and $P_4$ pictures. A $B_1$ picture is dependent on the $I_0$, P4, and $B_2$ pictures. A $B_3$ picture is dependent on the $I_0$, $P_4$, $B_1$, and $B_2$ pictures. In this case, the display order is $I_0$, $B_1$, $B_2$, $B_3$, and $P_4$; and the transmission order is $I_0$, $P_4$, $B_2$, $B_1$, and $B_3$. A motion vector is obtained by using at least one of forward, backward, bi-directional, and direct estimation schemes.

Figure 4:
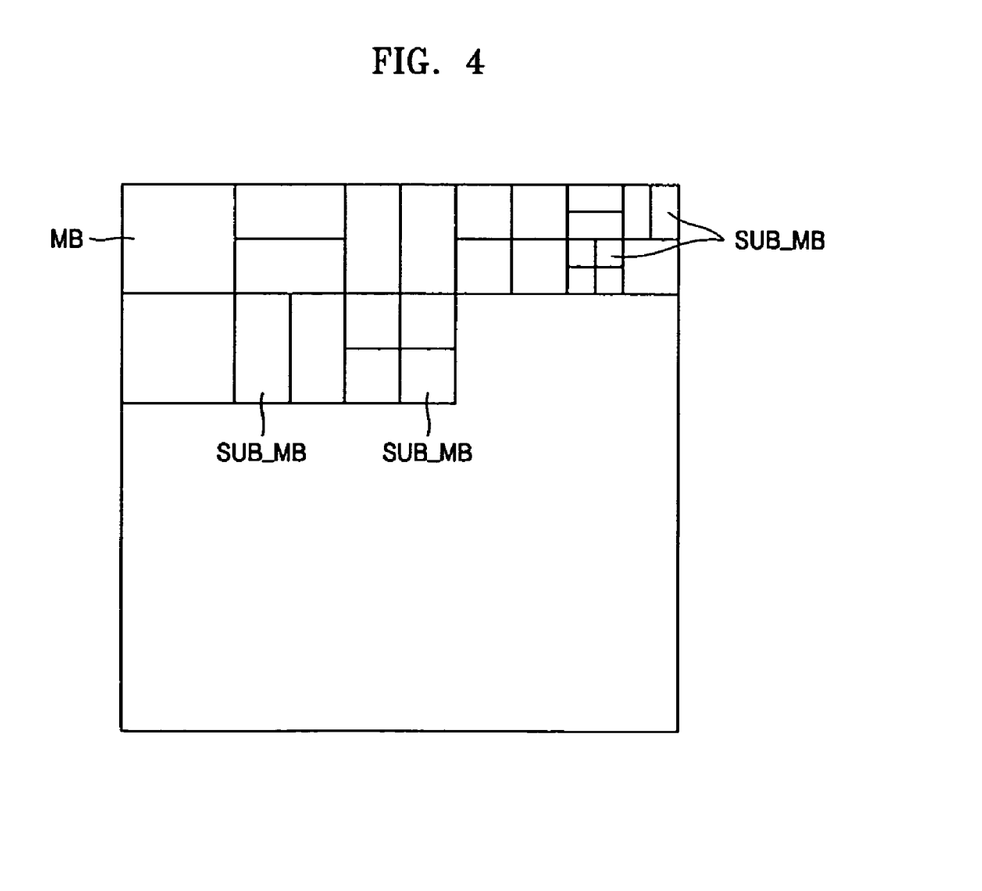
FIG. 4 is a view illustrating unit blocks used to determine a reference picture and compensate for a motion of the reference picture according to an exemplary embodiment of the present invention.

FIG. 4 is a view illustrating unit blocks used to determine a reference picture and compensate for a motion of the reference picture according to an exemplary embodiment of the present invention.

A picture is partitioned into a plurality of blocks. Examples of the blocks include a 16×16 macro-block MB, a 16×8 sub-block SUB_MB obtained by horizontally partitioning the macro-block MB into two parts, a 8×16 sub-block SUB_MB obtained by vertically partitioning the macro-block MB into two parts, a 8×8 sub-block SUB_MB obtained by horizontally and vertically partitioning the macro-block MB into two parts, a 8×4 sub-block SUB_MB obtained by horizontally partitioning the 8×8 sub-block SUB_MB into two parts, a 4×8 sub-block SUB-_MB obtained by horizontally partitioning the 8×8 sub-block SUB_MB into two parts, and a 4×4 sub-block SUB_MB obtained by horizontally and vertically partitioning the 8×8 sub-block SUB_MB into two parts.

Figure 5:
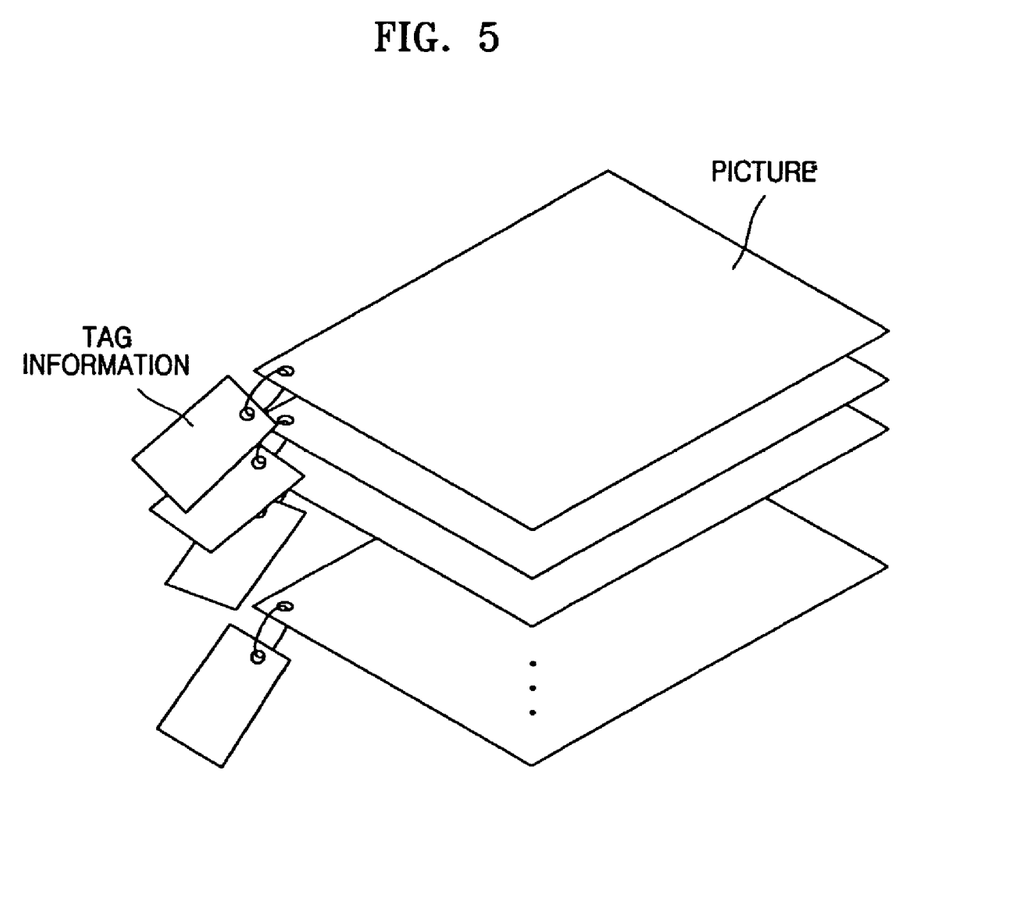
FIG. 5 is a view for explaining a reference picture determination process performed by the encoder in FIG. 1 and a reference picture determination process used for the decoder in FIG. 2.

FIG. 5 is a view for explaining a reference picture determination process performed by the encoder in FIG. 1 and a reference picture determination process used for the decoder in FIG. 2.

The reference picture determination process is based on the aforementioned multiple-reference scheme. In particular, the reference picture determination process is performed by referring to tag information corresponding to pictures. The tag information can be used to determine a reference picture. If the tag information is used, it is possible to detect the reference picture without performing the motion estimation process on all the pictures indicated by the reference index list.

The reason for utilizing the tag information is as follows.

In most video sequences representing a small motion, the most suitable reference picture is the recent picture prior to the current picture in time axis in display order. The video sequence is a physical or logical unit of moving picture data. Unfortunately, the recent picture is not suitable 1) when there is a big motion between the current and recent pictures, or 2) when there is a global change of the current picture. The big motion includes, for example, a rapid motion of a picture element such as a person or object, a rapid change of a shape of the picture element, and a sudden entrance or exit of the picture element. The global change of the current picture means a global change of contents or shape of the current picture including a scene change, a color change, and fading. The multiple-reference scheme is particularly useful for the cases 1) and 2).

In the prior art, various useful information generated during the motion estimation process is not used to determine or manage the reference picture. According to the present invention, such information is stored as tag information in the memory and used to determine the reference picture. As a result, the suitable reference picture can be determined without performing the motion estimation process on all the pictures indicated by the reference index list. Therefore, it is possible to reduce calculation time and data amount in the encoder and not to impose an additional burden on the decoder.

Figure 6:
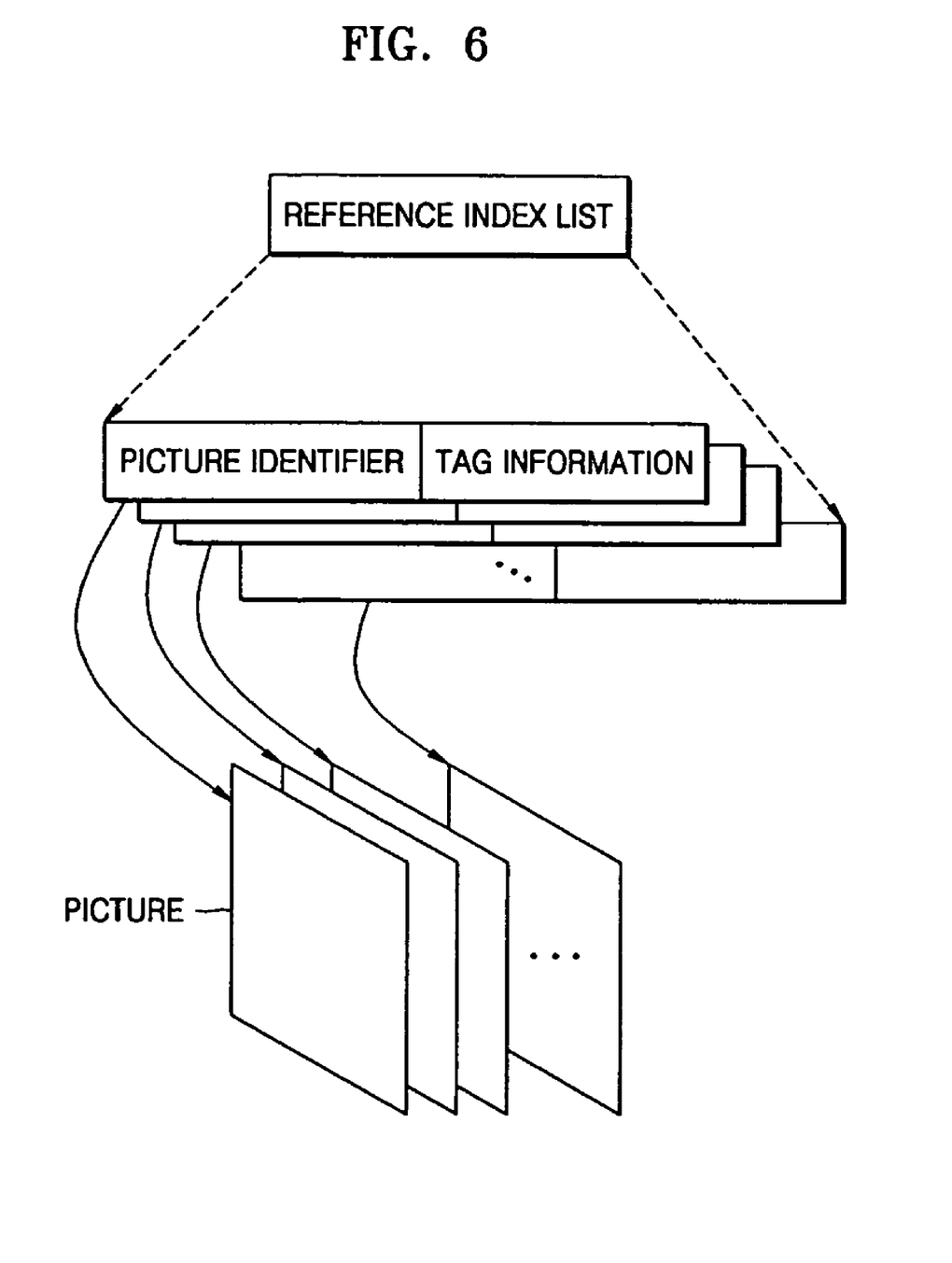
FIG. 6 is a view illustrating a data structure of a reference index list according to an exemplary embodiment of the present invention.

FIG. 6 is a view illustrating a data structure of a reference index list according to an exemplary embodiment of the present invention.

The reference index list is stored in the memory units 400 and 401 of the encoder of FIG. 1 and the decoder of FIG. 2. The reference index list contains a plurality of picture identifiers and tag information. The tag information and the picture identifiers correspond to each other. Pictures are identified by corresponding picture identifiers. The tag information represents a change of a picture identified by a picture identifier to the next picture, which follows the picture in time axis in display order. In other words, the tag information represents a change of the identified picture to the current picture at the time of attaching the tag information including a big motion or a global change.

According to an exemplary embodiment of the present invention, the reference index list comprises a short term reference index used for a short term reference and a long term reference index used for a long term reference. The short and long term reference indexes are classified based on life time of the index loading on the reference index list. According to the an exemplary embodiment of the present invention, the tag information is attached to only pictures indicated by the reference index list. The short term reference index indicates a recent picture, which is a picture prior to the current picture in time axis in display order, as described above. The recent picture may be a past or future picture. The number of pictures indicated by the short and long term reference indexes is predetermined. The details of the short and long term reference indexes are described in the Standard H.264, and the description thereof is omitted.

Figure 7:
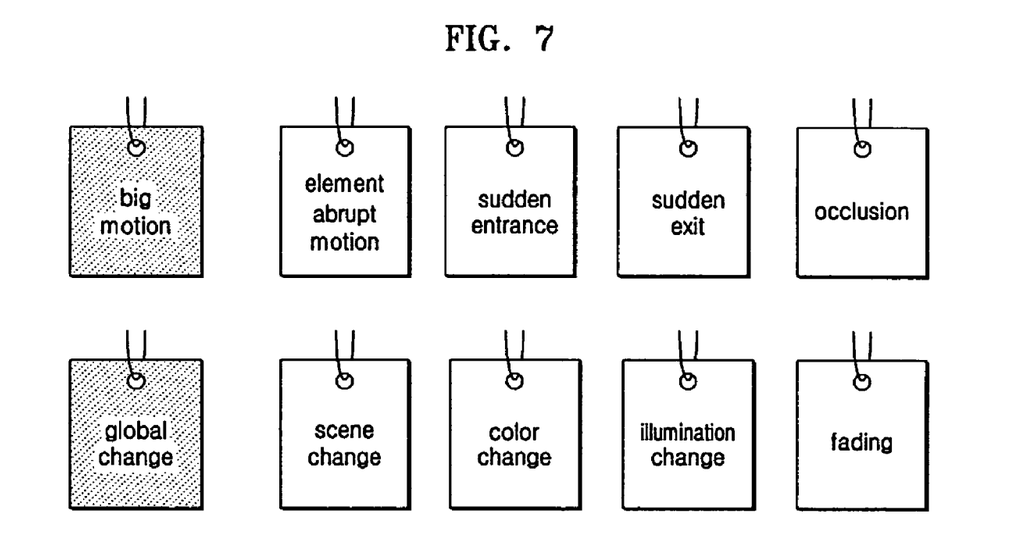
FIG. 7 is a view illustrating tag information according to an exemplary embodiment of the present invention.

FIG. 7 is a view illustrating tag information according to an exemplary embodiment of the present invention.

According to an exemplary embodiment of the present invention, the tag information indicates a big motion or a global change. The big motion includes, for example, a rapid motion of a picture element such as a person or object, a sudden entrance or exit of the picture element, and an occlusion of screen. The global change of the current picture means a global change of contents or shape of the current picture including a scene change, a color change, an illumination change, and fading.

According to an exemplary embodiment of the present invention, pictures are loaded on the reference index list in the following manner.

After the motion estimation of the current picture is ended, the recent picture used as a first reference picture for the current picture is treated as follows. If it is used for a reference picture for a majority of blocks of the current picture, the recent picture is loaded as a short term reference index on the reference index list. The recent picture is loaded on the reference index list during a predetermined short term. If the recent picture is not used for a reference picture for a majority of blocks of the current picture, it is determined whether tag information can be allocated to the recent picture. If the tag information is allocated to the recent picture, the tag information is attached to the recent picture. It is determined whether there is a big motion or a global change of the recent picture relative to the current picture. If there is the big motion or global change, corresponding tag information is attached to the recent picture. The recent picture attached by the tag information is loaded as a long term reference index on the reference index list. If the tag information is not allocated to the recent picture, the recent picture is not loaded on the reference index list but removed. Besides the aforementioned manner, various manners can be used to load the pictures on the reference index list.

According to an exemplary embodiment of the present invention, pictures are removed from the reference index list in the following manner.

When a picture having a plurality of blocks using the recent picture as a reference picture is loaded on the reference index list, the recent picture is removed. In addition, the number of pictures loaded on the reference index list is above a predetermined number and pictures to be removed are selected based on a predetermined criterion. For example, the predetermined criterion includes Criterion 1 where a farthest picture from the current picture in time axis is first removed, Criterion 2 where a least-referred picture is first removed, Criterion 3 where an oldest-referred picture is first removed, and Criterion 4 where a picture determined based on the tag information is first removed but a picture having a scene change is not removed. The criteria 1 to 4 may be applied in multiple times with their own priorities. Besides the aforementioned manner, various manners can be used to remove the pictures from the reference index list.

Now, a method of determining a reference picture according to an exemplary embodiment of the present invention will be described.

Figure 8:
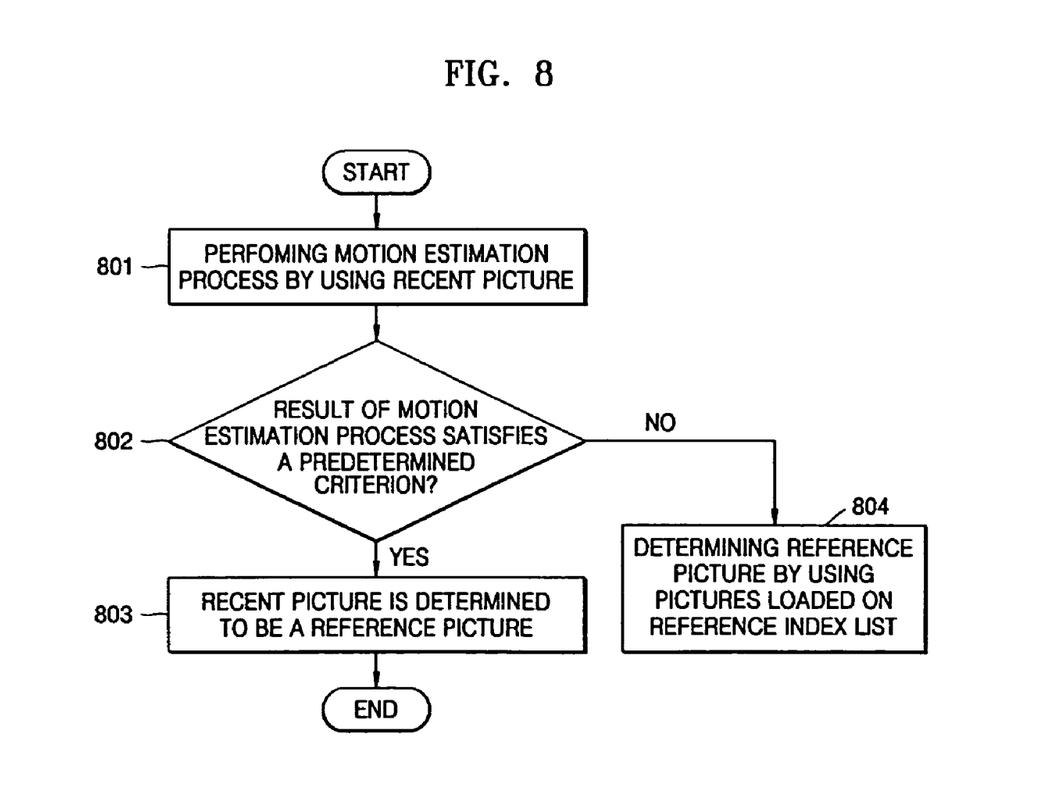
FIG. 8 is a flowchart for explaining a method of determining a reference picture according to an exemplary embodiment of the present invention.

FIG. 8 is a flowchart for explaining the method of determining a reference picture according to an exemplary embodiment of the present invention First, a motion estimation process is performed by using a recent picture prior to a current block in time axis in display order (Step 801). If a result of the motion estimation process satisfies a predetermined criterion (Step 802), the recent picture is determined to be a reference picture for the current block (Step 803). In the embodiment, various criteria for the motion estimation process can be employed. For example, if residual errors obtained from the motion estimation process are not more than a predetermined threshold value, a recent picture is determined to be a reference picture. In practice, in a case where a current picture is a picture constituting a video sequence showing a smooth motion, a motion estimation process using a recent picture is not more than the predetermined threshold value in every block. In this case, the motion estimation process is performed by using the recent picture as a reference picture.

If the result of the motion estimation process does not satisfy the predetermined criterion (Step 802), for example, if the residual errors are more than the predetermined threshold value, a reference picture is determined by using other pictures loaded on a reference index list (Step 804). There are various methods of determining a reference picture by using a plurality of other pictures loaded on the reference index list.

Figure 9:
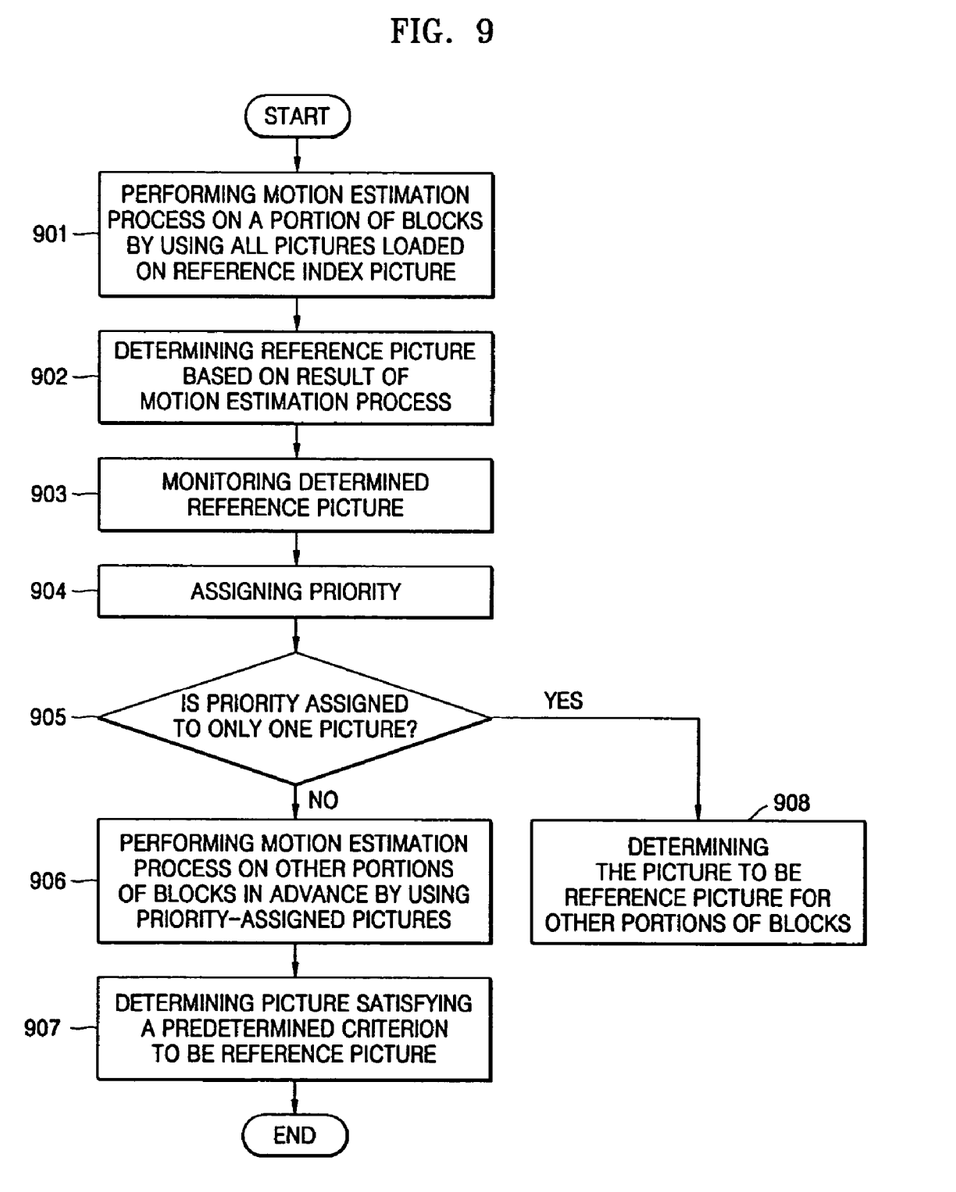
FIG. 9 is a flowchart illustrating an example of Step 804 in FIG. 8.

FIG. 9 is a flowchart illustrating an example of Step 804 in FIG. 8.

The motion estimation process is performed on a portion of blocks constituting a picture or a slice by using all pictures loaded on the reference index picture (Step 901). The slice is a minimal unit of a data sequence having a start code and constructed with a plurality of macro-blocks. In general, a picture is constructed with a plurality of slices. The portion of blocks can be selected in various manners,for example, a predetermined number of blocks located at a front portion of the picture or slice can be selected. Next, a picture showing the best result of the motion estimation process is determined to be a reference picture (Step 902). For example, a picture having the lowest residual error or the highest compression rate may be determined to be a reference picture. Next, the determined reference pictures are monitored (Step 903). Priority is assigned to a plurality of pictures loaded on the reference index list (Step 904). For example, if most of the reference pictures in a portion of blocks of a picture or slice, that is, blocks located at a front of the picture or slice, are detected to have tag information corresponding to a scene change, priority is assigned to a picture having tag information of the scene change (and the associated tag information of a global change). A lower level of priority may be assigned to another picture having tag information of a scene change or another global change. Alternatively, priority may be assigned to the pictures which have been selected at least one time. In addition, different levels of priorities may be assigned to the pictures in accordance with their selected times. An order of a plurality of pictures loaded on the reference index list is defined by their priorities. If a plurality of pictures have the same priority, a higher priority is assigned to a recent picture out of the plurality of pictures in consideration of the display order. Priorities are assigned to some pictures loaded on the reference index list. In addition, a relation between tag information of pictures may be defined to assign priorities to the tag information of the pictures.

If there are a plurality of priority-assigned pictures (Step 905), the motion estimation process on other portions of blocks constituting a picture or slice is performed in advance by using the priority-assigned pictures (Step 906). If a plurality of pictures have the same priority, the motion estimation process is performed by using a recent picture ahead of other pictures. If a picture satisfying a predetermined criterion is detected in the motion estimation process, the picture is determined to be a reference picture (Step 907). For example, if a picture having a residual error not more than a predetermined threshold value is detected, the picture is determined to be a reference picture. If a picture satisfying a predetermined criterion is detected, the motion estimation process is not performed on the priority-assigned pictures as well as the remaining pictures.

In addition, it is not necessary to perform a motion estimation process on all the priority-assigned pictures. The motion estimation process may be performed on a portion of the priority-assigned pictures, and a picture closest to a predetermined criterion may be determined to be a reference picture. An example is a case where a high processing speed is more important than a high image quality. The motion estimation process is optionally performed on non-priority-assigned pictures. For example, in a case where it is most important to detect a picture satisfying a predetermined criterion, if priority is not assigned to the picture, the motion estimation process is performed on the remaining pictures. A picture closest to a predetermined criterion out of the remaining pictures is determined to be a reference picture. Alternatively, in a case where the motioned estimation process is performed on the priority-assigned pictures and a picture satisfying a predetermined criterion is not detected, the motion estimation process may not be performed on the remaining pictures. In this case, a picture closest to a predetermined criterion out of the priority-assigned pictures is determined to be a reference picture.

If priority is assigned to only one picture (Step 905), the motion estimation process is not performed on the other portions of blocks, and the picture is determined to be a reference picture (Step 908). The other portions of blocks means blocks where a reference picture is not determined in Step 901.

If a majority of blocks select only one reference picture as a result of the monitoring process of Step 903, priority is assigned to only the reference picture (Step 904). The motion estimation process is not performed on other portions of blocks, and the picture is determined to be a reference picture for other portions of blocks (Step 908). Herein, the term "majority" of blocks means 100%, 80%, 50%, etc., of total blocks. In addition, in a case where a reference picture in the Step 904 is required to have tag information, for example, tag information of a global change, priority may be assigned to only the picture having the tag information.

On the other hand, the encoding apparatus of FIG. 1 calculates a motion vector by performing a motion estimation process by using the determined reference pictures and performs a motion compensation process by using the calculated motion vector and the determined reference pictures. In other words, the motion estimation unit 600 calculates a motion vector by using the determined reference pictures, and the motion compensation unit 500 performs a motion compensation process by using the calculated motion vector and the determined reference pictures.

On the other hand, the decoding apparatus of FIG. 2 performs a motion compensation process by using the determined reference pictures and the corresponding motion vectors. In other words, the motion compensation unit 510 performs a motion compensation process by using the calculated motion vector and the determined reference pictures.

In addition, a method of determining a reference picture and a method of compensating for a motion according to the present invention can also be embodied as computer readable codes on a computer readable recording medium. The computer readable recording medium is any data storage device that can store data which can be thereafter read by a computer system. Examples of the computer readable recording medium include magnetic storage devices, optical data storage devices, and carrier waves (such as data transmission through the Internet). The programs, codes, and code segments for accomplishing the present invention can be easily construed by programmers skilled in the art to which the present invention pertains.

According to the present invention, it is possible to improve compression rate and to reduce calculation complexity in encoding and decoding processes. Since the number of pictures to be referred to in a motion estimation process on current blocks is reduced, it is possible to reduce calculation amount and to effectively determine reference pictures in a reduced time. In addition, it is possible to prepare a reference index list having a better result of a motion estimation process on current blocks. It is possible to determine a picture capable of giving a higher compression rate to be a reference picture than a video sequence currently processed.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of determining a reference picture for blocks constituting a current picture, the method comprising:
    (a) preparing tag information describing motion between a plurality of pictures in a reference index list; and
    (b) determining, by a motion estimation unit, one of the plurality of pictures to be the reference picture by referring to the tag information and performing a motion estimation process on at least one block constitutina a current picture with respect to the plurality of pictures in the reference index list;
    wherein another motion estimation process for the blocks constituting a current picture is performed by using the determined reference picture.

2. The method of claim 1, wherein (b) comprises:
    (b1) assigning priority to at least one picture based on the tag information;
    (b2) performing the motion estimation process on the blocks by using the priority-assigned picture ahead of other pictures; and
    (b3) if a picture satisfying a predetermined criterion is detected in the motion estimation process of (b2), determining the picture to be the reference picture.

3. The method of claim 2, wherein (b1) comprises performing a monitoring process on tag information corresponding to the determined reference picture for a predetermined number of blocks constituting the current picture, and assigning priority to a picture having tag information equal to or associated with the tag information corresponding to multiple reference pictures.

4. The method of claim 2, wherein (b1) comprises performing a monitoring process on tag information corresponding to the determined reference picture for blocks constituting the current picture or blocks being located on a predetermined portion of slices constituting the current picture, and assigning priority to a picture having tag information equal to or associated with the tag information corresponding to multiple reference pictures.

5. The method of claim 2, wherein (b2) comprises, if a plurality of pictures have the same priority, performing the motion estimation process by using a recent picture ahead of other pictures.

6. The method of claim 2, wherein (b3) comprises, if a picture having a residual error not more than a predetermined threshold value is detected, determining the picture to be the reference picture.

7. The method of any one of claims 1 through 6, wherein the tag information indicates a big motion or a global change of the reference picture relative to the current picture.

8. A method of determining a reference picture, the method comprising:
    (a) performing, by a motion estimation unit, a motion estimation process on blocks constituting a portion of a current picture by using pictures indicated by a reference index list, and determining the reference picture based on tag information of the pictures and a result of the motion estimation process, wherein the tag information describes motion between the pictures; and (b) monitoring the determined reference picture, and determining a reference picture for blocks constituting another portion of the current picture based on a result of the monitoring process.

9. The method of claim 8, wherein (a) comprises determining a reference picture for blocks being located on the current picture or at a front portion of a slice of the current picture.

10. The method of claim 8, wherein (b) comprises, if multiple reference pictures have tag information indicating a big motion or a global change, determining a picture corresponding to the tag information as the reference picture for blocks constituting another portion of the current picture.

11. The method of claim 8, wherein (b) comprises:
(b1) assigning priority to a picture having tag information equal to or associated with tag information corresponding to multiple reference pictures out of pictures indicated by the reference index list;
(b2) performing a motion estimation process by using the priority-assigned picture ahead of other pictures; and
(b3) determining the reference picture based on a result of the motion estimation process.

12. The method of claim 11, wherein (b2) comprises, if a plurality of pictures have the same priority, performing the motion estimation process by using a recent picture ahead of other pictures.

13. The method of claim 11, wherein (b3) comprises, if a picture having a residual error not more than a predetermined threshold value is detected, determining the picture to be the reference picture.

14. A method of determining a reference picture for blocks constituting a current picture by using a multiple-reference scheme, the method comprising:
(a) performing, by a motion estimation unit, a motion estimation process by using a recent picture;
(b) if a resulting value of the motion estimation process is not more than a predetermined threshold value, determining the recent picture as the reference picture; and
(c) if a resulting value of the motion estimation process is more than a predetermined threshold value, determining the reference picture by using pictures indicated by the reference index list,
wherein (c) comprises:
(c3) preparing tag information describing motion between the pictures indicated by the reference index list,
(c11) performing the motion estimation process on the pictures indicated by the reference index list; and
(c12) determining the reference picture based on the tag information and a result of the motion estimation process of (c11).

15. The method of claim 14, wherein (c12) comprises, if a picture having a residual error not more than a predetermined threshold value is detected, determining the picture to be the reference picture.

16. The method of claim 14, wherein (c) comprises:
(c21) assigning priority to at least one of the pictures indicated by the reference index list based on tag information;
(c22) performing a motion estimation process on the blocks by using the priority- assigned picture ahead of other pictures; and
(c23) determining the reference picture based on a result of the motion estimation process.

17. The method of claim 16, wherein (c21) comprises performing a monitoring process on tag information corresponding to the determined reference picture for a predetermined number of blocks constituting the current picture, and assigning priority to a picture having tag information equal to the tag information corresponding to multiple reference pictures.

18. The method of claim 16, wherein (c21) comprises performing a monitoring process on tag information corresponding to the determined reference picture for a predetermined number of blocks constituting the current picture, and assigning priority to a picture having tag information equal to or associated with the tag information corresponding to multiple reference pictures.

19. The method of claim 16, wherein (c23) comprises, if a picture having a residual error not more than a predetermined threshold value is detected, determining the picture to be the reference picture.

20. A method of determining a reference picture for blocks constituting a current picture by using a multiple-reference scheme, the method comprising:
(a) performing a motion estimation process by using a recent picture;
(b) if a resulting value of the motion estimation process is not more than a predetermined threshold value, determining the recent picture as the reference picture; and
(c) if a resulting value of the motion estimation process is more than a predetermined threshold value, determining the reference picture by using pictures indicated by the reference index list, wherein (c) comprises (c3) preparing the reference index list,
wherein (c3) comprises:
loading the recent picture on the reference index list when the recent picture is used as a reference picture for blocks constituting the current picture;
loading the recent picture on the reference index list when the recent picture is not used as the reference picture for blocks constituting the current picture and tag information is assigned to the recent picture; and
removing the recent picture when the recent picture is not used as the reference picture for blocks constituting the current picture and tag information is not assigned to the recent picture.

21. The method of claim 20, wherein (c3) further comprises: loading a picture having tag information indicating a big motion of the current picture on the reference index list; and
loading a picture having tag information indicating a global change of the current picture on the reference index list.

22. A method of compensating for a motion, the method comprising:
(a) reading a reference picture, wherein the reference picture is obtained by performing, by a motion compensation unit, a motion estimation process on blocks constituting a portion of a current picture by using pictures indicated by a reference index list, determining the reference picture based on tag information of the pictures and a result of the motion estimation process, performing a monitoring process on the tag information attached to the determined reference picture, and determining a reference picture for blocks constituting another portion of the current picture based on a result of the monitoring process, wherein said tag information describes motion between the pictures; and
(b) performing a motion compensation process by using a motion vector corresponding to the read reference picture.

23. The method of claim 22, wherein the determined reference picture is obtained by determining a picture corresponding to the tag information if multiple reference pictures have tag information indicating a big motion or a global change.

24. The method of claim 22, wherein the determined reference picture is obtained by assigning priority to a picture having tag information equal to or associated with tag information corresponding to multiple reference pictures out of pictures indicated by the reference index list, performing a motion estimation process by using the priority-assigned picture ahead of other pictures.

25. An apparatus for encoding moving picture data, the apparatus comprising:
   a memory unit which stores a reference index list and pictures, wherein tag information is attached to a portion of the pictures indicated by the reference index list;
   a motion estimation unit which performs a motion estimation process on blocks constituting a portion of a current picture by using pictures indicated by a reference index list, determines a reference picture based on tag information of the pictures and a result of the motion estimation process, monitors the determined reference picture, determines a reference picture for blocks constituting another portion of the current picture based on a result of the monitoring process, and calculates a motion vector for the blocks based on the determined reference picture for blocks constituting another portion of the current picture, wherein said tag information describes motion between the pictures; and
   a motion compensation unit which performs a motion compensation process by using the reference picture corresponding to the motion vector calculated by the motion estimation unit.

26. The apparatus of claim 25, wherein the motion estimation unit assigns priority to a picture having tag information equal to or associated with tag information corresponding to multiple reference pictures out of pictures indicated by the reference index list, performs a motion estimation process by using the priority-assigned picture ahead of other pictures.

27. An apparatus for decoding a bitstream having encoded moving picture data, the apparatus comprising:
   a memory unit which stores a reference picture, wherein the reference picture is obtained by performing a motion estimation process on blocks constituting a portion of a current picture by using pictures indicated by a reference index list, determining a reference picture based on tag information of the pictures and a result of the motion estimation process, performing a monitoring process on the tag information attached to the determined reference picture, and determining a reference picture for blocks constituting another portion of the current picture based on a result of the monitoring process, wherein the current picture constitutes the encoded moving picture data, and wherein the tag information describes motion between the pictures;
   a motion vector decoding unit which decodes the motion vector extracted from the bitstream; and
   a motion compensation unit which performs a motion compensation process by using a reference picture read from the memory and a motion vector provided by the motion vector decoding unit.

28. The apparatus of claim 27, wherein the reference picture is obtained by assigning priority to a picture having tag information equal to or associated with tag information corresponding to multiple reference pictures out of pictures indicated by the reference index list, performing a motion estimation process by using the priority-assigned picture ahead of other pictures.

* * * * *

UNITED STATES PATENT AND TRADEMARK OFFICE
CERTIFICATE OF CORRECTION

PATENT NO. : 7,646,811 B2
APPLICATION NO. : 10/828417
DATED : January 12, 2010
INVENTOR(S) : Ha et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1236 days.

Signed and Sealed this

Twenty-eighth Day of December, 2010

David J. Kappos
*Director of the United States Patent and Trademark Office*